United States Patent [19]

Cole, III et al.

[11] 3,793,705
[45] Feb. 26, 1974

[54] PROCESS FOR BRAZING A MAGNETIC CERAMIC MEMBER TO A METAL MEMBER

[75] Inventors: Thomas R. Cole, III, Boulder; William D. Kehr, Longmont; James R. Wiitala, Louisville, all of Colo.

[73] Assignee: International Business Machines Corporation, Armonk, N.Y.

[22] Filed: Dec. 11, 1972

[21] Appl. No.: 313,894

[52] U.S. Cl............. 29/473.1, 29/603, 179/100.2 C
[51] Int. Cl............................................. B23k 31/02
[58] Field of Search...... 29/473.1, 603; 179/100.2 C

[56] References Cited
UNITED STATES PATENTS

| | | | |
|---|---|---|---|
| 2,984,709 | 5/1961 | Rettinger | 179/100.2 C |
| 3,098,126 | 7/1963 | Kaspaul | 179/100.2 C |
| 3,132,044 | 5/1964 | Pearsall | 29/473.1 X |
| 3,412,455 | 11/1968 | Bronnes et al. | 29/473.1 X |
| 3,505,041 | 4/1970 | Bronnes et al. | 29/603 X |
| 3,672,045 | 6/1972 | Robertson | 29/603 |

FOREIGN PATENTS OR APPLICATIONS

| | | | |
|---|---|---|---|
| 1,171,955 | 6/1964 | Germany | 179/100.2 C |
| 813,829 | 5/1959 | Great Britain | 29/473.1 |
| 6,915,563 | 4/1971 | Netherlands | 29/603 |

OTHER PUBLICATIONS

Kehr et al., "Making Electromagnetic Shields Including Ferrite," IBM Technical Disclosure Bulletin, Vol. 15, No. 8, Jan. 1973.

*Primary Examiner*—J. Spencer Overholser
*Assistant Examiner*—Ronald J. Shore
*Attorney, Agent, or Firm*—Francis A. Sirr

[57] ABSTRACT

A strong, heat resistant, stress free joint is formed between nickel-zinc type ferrite ceramic and titanium by sputtering a thin chromium-containing metal layer on the ferrite joint site, and then brazing the metallized ferrite joint site to the titanium joint site by way of a silver-containing brazing alloy.

13 Claims, No Drawings

PROCESS FOR BRAZING A MAGNETIC CERAMIC MEMBER TO A METAL MEMBER

BACKGROUND OF THE INVENTION

While the art of joining metal to nonmetal provides various teachings, none of these teachings solve the problem of joining a magnetic ceramic, i.e., a ceramic which is magnetically permeable, to metal in a manner to achieve a high strength joint without degrading the magnetic properties of the ceramic.

Prior art methods of bonding metal to non-metal are known wherein titanium and the like are bonded to ceramic. A molybdenum-manganese metallizing process is first used to form a metal layer on the ceramic joint site. The metallized ceramic is then joined to the titanium by brazing with an alloy of silver or copper. In the alternative, the ceramic joint site is metallized by spraying or painting with a hydride of zirconium or titanium. The hydride is then decomposed by heat to leave a thin deposit of the metal. Bonding is made with silver solder or BT silver-copper eutectic solder. Both of these processes require firing at high temperatures ranging from the melting point of silver to approximately 1,300° C.

In another known method a silver-copper eutectic brazing material is disposed between a ceramic member and a titanium member. The assembly is then heated to a temperature sufficiently high to cause a portion of the titanium member to diffuse through, or alloy with, the silver-copper eutectic and wet the ceramic member.

A known method of forming ceramic-to-metal seals uses a shim of titanium with BT solder. This method relies upon the fact that the solder readily wets and slightly dissolves the titanium. This solution, in turn, results in the solder wetting the ceramic.

Yet other prior art processes join ceramic to metal by first sputtering the ceramic joint site with an active metal such as molybdenum, tungsten, manganese, iron, cobalt or nickel. This active metal layer is then covered with metal from the platinum group, to protect the more active metal from oxidation and to permit the now-metallized ceramic joint site to be brazed to a metal member. As a modification thereof, an additional layer of stainless steel may be sputtered onto the above-mentioned platinum layer.

THE INVENTION

This invention is related to the field of metal working, and to the assembly and/or joining of metal to nonmetal by way of a separate metallic bonding material, as by way of soldering or brazing.

This invention is more specifically related to a method for forming a strong, heat resistant, stress free joint between magnetic ceramic, such as nickel-zinc type ferrite ceramic, and titanium metal or alloys. The method of this invention produces a strong joint without changing the ceramic's magnetic properties.

More specifically, the present invention finds utility in mechanically joining a ferrite ceramic member to a nonmagnetic metal member, i.e., magnetically nonpermeable, wherein such members form a portion of a magnetic assembly. Particular utility has been found in the use of the invention to manufacture magnetic transducers wherein ferrite ceramic is an operable member of a magnetic recording and/or reproducing head, this ceramic member being mounted on or attached to a titanium head housing. The joint produced by this invention is strong enough to withstand subsequent grinding, lapping, cleaning and assembly techniques, and, in fact, a shear strength in the range of 2,000–7,000 psi can be realized with this invention. Additionally, the joint produced by this invention is sufficiently heat resistant to permit thermal cleaning at temperatures as high as 600° C.

The method of this invention achieves the foregoing joint-strength objective without degrading the magnetic properties of the ferrite ceramic member, since, for example, reducing or oxidizing atmospheres, temperatures approaching 1,000° C, and mechanical stress of the ceramic are avoided.

Since ferrite ceramics are not "wetted" by conventional brazing alloys, this invention provides a unique step of metallizing this member's joint site with a single layer of chromium-containing metal prior to brazing. This layer of metallization is selected to be at least partially soluble with a silver-containing brazing alloy at a relatively low brazing temperature. The metal layer has a higher melting and vaporization temperature than that of the brazing alloy. The brazing alloy is selected such that the metal to be joined to the ferrite ceramic is also at least partially soluble with this brazing alloy.

This metallization is achieved by the step of sputtering a thin layer of chromium-containing metal onto the ceramic joint site. The sputtered metal is selected to have a higher melting point than that of the brazing alloy. High chromium content insures good adherance to the ferrite ceramic. However, this chromium content, and its affinity for oxygen, tends to inhibit subsequent adhesion by the brazing alloy. As a result, metals such as 304 stainless steel (10 nickel-19 chromium-71 iron, by weight) are preferred.

The sputtering process causes the chromium-containing metal to arrive at the magnetic ceramic with higher energy than conventional processes such as electroplating or vacuum deposition. This higher energy of the chromium-containing metal enables the metal to form a strong oxide bond at the ceramic surface, thus contributing strength to the subsequently formed joint.

Specifically, the method of this invention provides an initial step of chemically and thermally cleaning the joint sites of both the magnetic ceramic member and the metal member. The term joint site is defined as that surface area which will subsequently be subjected to brazing techniques to form a unitary assembly. Subsequently, a layer of chromium-containing metal, approximately 10 micro inches thick, and not appreciably greater than 50 micro inches thick, is sputtered on the ceramic joint site. While a thicker sputtered layer can be used, the strength of the resulting joint is not appreciably greater, and the sputtering time is appreciably increased. The now-metallized ceramic is mechanically mounted, as by clamping, with its joint site and the metal member's joint site separated by a silver-containing brazing alloy, for example, in foil form. The assembly is placed in an inert environment, such as vacuum ($10^{-3}$ to $10^{-6}$ torr), preheated for approximately one-half hour at 600° C, and then heated to approximately 825° C to 840° C for from one to two minutes, and not more than five minutes. A critical feature of the present invention is that the brazing temperature be at least 600°, to enable subsequent thermal cleaning, and that this temperature not approach 1,000°, to avoid damage to the ceramic's magnetic properties.

The invention is of particular utility when the above-mentioned ceramic member is ferrite ceramic, such as nickel-zinc ferrite, and when the above-mentioned metal member is titanium or an alloy thereof having substantially the same coefficient of thermal expansion as the ferrite.

The above method describes a generic embodiment of this invention. Within the teaching of this invention various parameters of the method can be varied. For example, the ceramic can be metallized with 50 nickel-50 chromium by weight, 10 nickel-19 chromium-71 iron by weight (304 stainless steel), or other stainless steels. Nickel and/or iron alloys containing tantalum, molybdenum, or tungsten are to be considered equivalent to the above alloys containing chromium. A critical feature of the present invention is, however, that metallization be applied to the ceramic under conditions that do not mechanically damage the ceramic or detract from its magnetic properties.

The silver-containing brazing alloy can, for example, be formed of 95 silver-5 aluminum by weight, 72 silver-28 copper by weight (eutectic), 71.5 silver-27.5 copper-1 nickel by weight, or any other silver material which is compatible with a relatively low brazing temperature in the range of 650° to 900° C. Higher temperatures have the effect of reducing the ceramic's magnetic properties and must be avoided, while lower temperatures tend to inhibit subsequent thermal cleaning of the joined assembly.

The metal to which the ferrite member is to be joined may be, for example, titanium, titanium alloy, or stainless steel, such as AISI 430F stainless. The critical feature of this metal is that it have a sufficiently high melting and vaporizing temperature to readily accept the brazing alloy in the defined brazing temperature range. Of course, low residual stress is required, since stressing the ceramic tends to degrade its magnetic properties; therefore, this metal should have a coefficient of thermal expansion near that of the ceramic member. Titanium has a coefficient of thermal expansion which nearly matches several ferrite ceramics.

As an additional parameter which may be varied within the teachings of the present invention, argon or other pure, inert gas may be used in place of vacuum during the brazing step.

A preferred embodiment of the invention utilizes a brazing alloy consisting of 71.5 silver-27.5 copper-1 nickel by weight, and a sputtered metallization of 10 nickel-19 chromium-71 iron by weight.

While the invention has been particularly described with reference to preferred embodiments thereof, it will be understood by those skilled in the art that various changes in form and details may be made therein without departing from the spirit and scope of the invention.

What is claimed is:

1. A method for joining a magnetic-ceramic magnetic-head member to a nonmagnetic-metal head-housing, comprising the steps of:
    a. cleaning both the ceramic and the metal joint sites,
    b. sputtering a thin layer of chromium-containing metal onto the ceramic joint site, said metal being at least partially soluble with a selected silver-containing brazing alloy at a brazing temperature in the range of 600° C to less than 1,000° C,
    c. mechanically mounting the ceramic and the metal joint sites with said selected silver-containing brazing alloy intermediate thereto, and
    d. placing the assembly in an inert environment and heating the assembly to a temperature in the range of from 600° C to less than 1,000° C for a time period not exceeding five minutes to braze the ceramic member to the metal housing.

2. The method defined in claim 1 including the step of preheating the assembly for approximately one-half hour at a temperature of approximately 600° C.

3. The method defined in claim 1 wherein said sputtered metal is selected from the group 50 Cr-50 Ni by weight, 10 nickel-19 chromium-71 iron by weight, and other stainless steels.

4. The method defined in claim 1 wherein said brazing alloy is selected from the group 95 silver-5 aluminum by weight, 72 silver-28 copper by weight, and 71.5 silver-27.5 copper-1 nickel by weight.

5. The method defined in claim 2 wherein said sputtered metal is selected from the group 50 chromium-50 nickel by weight, 10 nickel-19 chromium-71 iron by weight, and stainless steel; and wherein said brazing alloy is selected from the group 95 silver-5 aluminum by weight, 72 silver-28 copper by weight, and 71.5 silver-27.5 copper-1 nickel by weight.

6. The method defined in claim 5 wherein the preheated assembly is heated to approximately 825° C for one to 2 minutes.

7. The method defined in claim 6 wherein the ceramic member is a nickel-zinc ferrite and wherein the head-housing is titanium or a titanium alloy having substantially the same coefficient of thermal expansion as said ferrite.

8. The method defined in claim 1 wherein the sputtered metal is 10 nickel-19 chromium-71 iron by weight, and wherein said brazing alloy is 71.5 silver-27.5 copper-1 nickel by weight.

9. A method for brazing a magnetic ceramic to a nonmagnetic metal, comprising the steps of:
    a. cleaning both the ceramic and the metal joint sites,
    b. sputtering a thin layer of chromium-containing metal onto the ceramic joint site, said metal being selected to be at least partially soluble with a selected silver-containing brazing foil at a brazing temperature which is in the range of from 600° C to less than 1,000° C,
    c. mechanically supporting the ceramic and nonmagnetic metal joint sites with said selected silver-containing brazing foil intermediate thereto, said brazing foil being selected to wet both the ceramic's sputtered layer of metal and the nonmagnetic metal,
    d. preheating the mechanically supported assembly in an inert environment at a temperature of approximately 600° C, and
    e. thereafter heating the assembly to a temperature in the range of from 600° to less than 1,000° C for a time period not exceeding 5 minutes to braze said ceramic to said nonmagnetic metal.

10. The method defined in claim 9 wherein said sputtered metal is selected from the group 50 chromium-50 nickel by weight, 10 nickel-19 chromium-71 iron by weight, and other stainless steels; wherein the sputtered layer thereof is approximately 10 micro inches thick, and not appreciably greater than 50 micro inches thick; and wherein said brazing material is selected from the group 95 silver-5 aluminum by weight, 72 silver-28 copper by weight, and 71.5 silver-27.5 copper-1 nickel by weight.

11. The method defined in claim 10 wherein the preheated assembly is heated to approximately 825° C for 1 to 2 minutes.

12. The method defined in claim 11 wherein the ceramic member is a nickel-zinc ferrite and the nonmagnetic metal is titanium or a titanium alloy having substantially the same coefficient of thermal expansion as said ferrite.

13. The method defined in claim 9 wherein the sputtered metal is 10 nickel-19 chromium-71 iron by weight, and wherein said brazing alloy is 71.5 silver-27.5 copper-1 nickel by weight.

* * * * *